United States Patent
Light-Holets et al.

(10) Patent No.: US 11,235,751 B2
(45) Date of Patent: Feb. 1, 2022

(54) OPTIMIZING DIESEL, REDUCTANT, AND ELECTRIC ENERGY COSTS

(71) Applicant: Cummins Inc., Columbus, IN (US)

(72) Inventors: Jennifer Kay Light-Holets, Greenwood, IN (US); Robert Dziuba, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 15/869,519

(22) Filed: Jan. 12, 2018

(65) Prior Publication Data

US 2019/0217851 A1  Jul. 18, 2019

(51) Int. Cl.

| | |
|---|---|
| *B60W 20/15* | (2016.01) |
| *F02D 41/02* | (2006.01) |
| *F02N 11/08* | (2006.01) |
| *B60L 58/12* | (2019.01) |
| *F02D 41/14* | (2006.01) |
| *F02D 41/24* | (2006.01) |
| *F02D 41/30* | (2006.01) |
| *B60L 15/20* | (2006.01) |
| *B60W 10/08* | (2006.01) |
| *F01N 3/20* | (2006.01) |
| *F01N 9/00* | (2006.01) |

(52) U.S. Cl.
CPC ......... *B60W 20/15* (2016.01); *B60L 15/2045* (2013.01); *B60L 58/12* (2019.02); *B60W 10/08* (2013.01); *F01N 3/2066* (2013.01); *F02D 41/021* (2013.01); *F02D 41/025* (2013.01); *F02D 41/1461* (2013.01); *F02D 41/2438* (2013.01); *F02D 41/3005* (2013.01); *F02N 11/0818* (2013.01); *B60L 2240/421* (2013.01); *B60L 2240/423* (2013.01); *B60W 2510/0619* (2013.01); *B60W 2556/50* (2020.02); *F01N 9/00* (2013.01); *F01N 2260/00* (2013.01); *F01N 2610/02* (2013.01); *F01N 2900/10* (2013.01); *F02D 2200/0625* (2013.01); *F02D 2200/701* (2013.01)

(58) Field of Classification Search
None
See application file for complete search history.

(56) References Cited

U.S. PATENT DOCUMENTS

| | | | |
|---|---|---|---|
| 8,825,243 B2 | 9/2014 | Yang et al. | |
| 9,103,248 B2 | 8/2015 | Light-Holets | |
| 9,187,085 B1* | 11/2015 | Nallapa | B60L 58/12 |
| 9,328,674 B2 | 5/2016 | Geveci et al. | |

(Continued)

FOREIGN PATENT DOCUMENTS

| | | |
|---|---|---|
| WO | WO-2008/025147 | 3/2008 |
| WO | WO-2010/126521 | 11/2010 |
| WO | WO-2016/070887 | 5/2016 |

*Primary Examiner* — Aniss Chad
*Assistant Examiner* — Mahmoud M Kazimi
(74) *Attorney, Agent, or Firm* — Foley & Lardner LLP

(57) ABSTRACT

Systems and methods to reduce operating expenses of a vehicle based on control of operation of a vehicle system. The system includes a controller. The controller is structured to receive one or more parameters comprising expense data, adjust operating expenses of a vehicle system based on the one or more parameters, and generate a command structured to adjust operation of the vehicle system responsive to the adjustment of the operating expenses.

16 Claims, 3 Drawing Sheets

(56) References Cited

U.S. PATENT DOCUMENTS

| | | | |
|---|---|---|---|
| 2007/0163244 A1* | 7/2007 | Federle | F01N 3/208 60/286 |
| 2010/0286909 A1* | 11/2010 | Tate, Jr. | G01C 21/3446 701/533 |
| 2013/0067890 A1* | 3/2013 | Michalek | F01N 13/009 60/274 |
| 2014/0260190 A1* | 9/2014 | DeGeorge | F02D 41/1461 60/274 |
| 2015/0226135 A1* | 8/2015 | Geveci | F02D 41/1463 701/22 |
| 2015/0354476 A1 | 12/2015 | Ge et al. | |
| 2016/0035001 A1* | 2/2016 | Driscoll | G06Q 30/0631 705/26.7 |
| 2016/0245662 A1* | 8/2016 | Rajagopalan | G01C 21/3469 |
| 2017/0320481 A1* | 11/2017 | Johannesson Mardh | B60W 20/12 |

\* cited by examiner

OPTIMIZING DIESEL, REDUCTANT, AND ELECTRIC ENERGY COSTS

TECHNICAL FIELD

The present application relates generally to a vehicle management system for reducing operating expenses of a vehicle.

BACKGROUND

An internal combustion engine burns gasoline, fuel oil, or other types of fuel to generate mechanical power. The burning of such fuel occurs via the use of an oxidizer (e.g., air) inside the internal combustion engine. Combustion of the fuel and air in the compression chambers of the engine produces exhaust gas. The exhaust gas is, in turn, managed (e.g., received and treated) by an exhaust aftertreatment system. Often times the costs of fuel and other sources to generate power fluctuate resulting in variable operating costs such that a need exists to reduce the operating costs of a vehicle.

SUMMARY

One implementation relates to an apparatus structured to reduce operating expenses of a vehicle based on control of operation of a vehicle system. The apparatus comprising: a controller, the controller structured to: receive one or more parameters comprising expense data; adjust operating expenses of a vehicle system based on the one or more parameters; and generate a command structured to adjust operation of the vehicle system responsive to the adjustment of the operating expenses.

Another implementation relates to a method comprising receiving one or more parameters comprising expense data; adjusting operating expenses of a vehicle system based on the one or more parameters; and generating a command structured to adjust operation of the vehicle system responsive to the adjustment of the operating expenses.

These and other features of the implementations described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Embodiments described herein relate generally to a vehicle management system (e.g., an expense management system) that includes a control system. In this regard, the control system may be structured to receive one or more parameters comprising expense data and adjust a performance state of the vehicle system based on the one or more parameters. In turn, the control system may be further structured to generate a command structured to adjust operation of the vehicle system responsive to the adjustment of the performance state.

Figure 1:
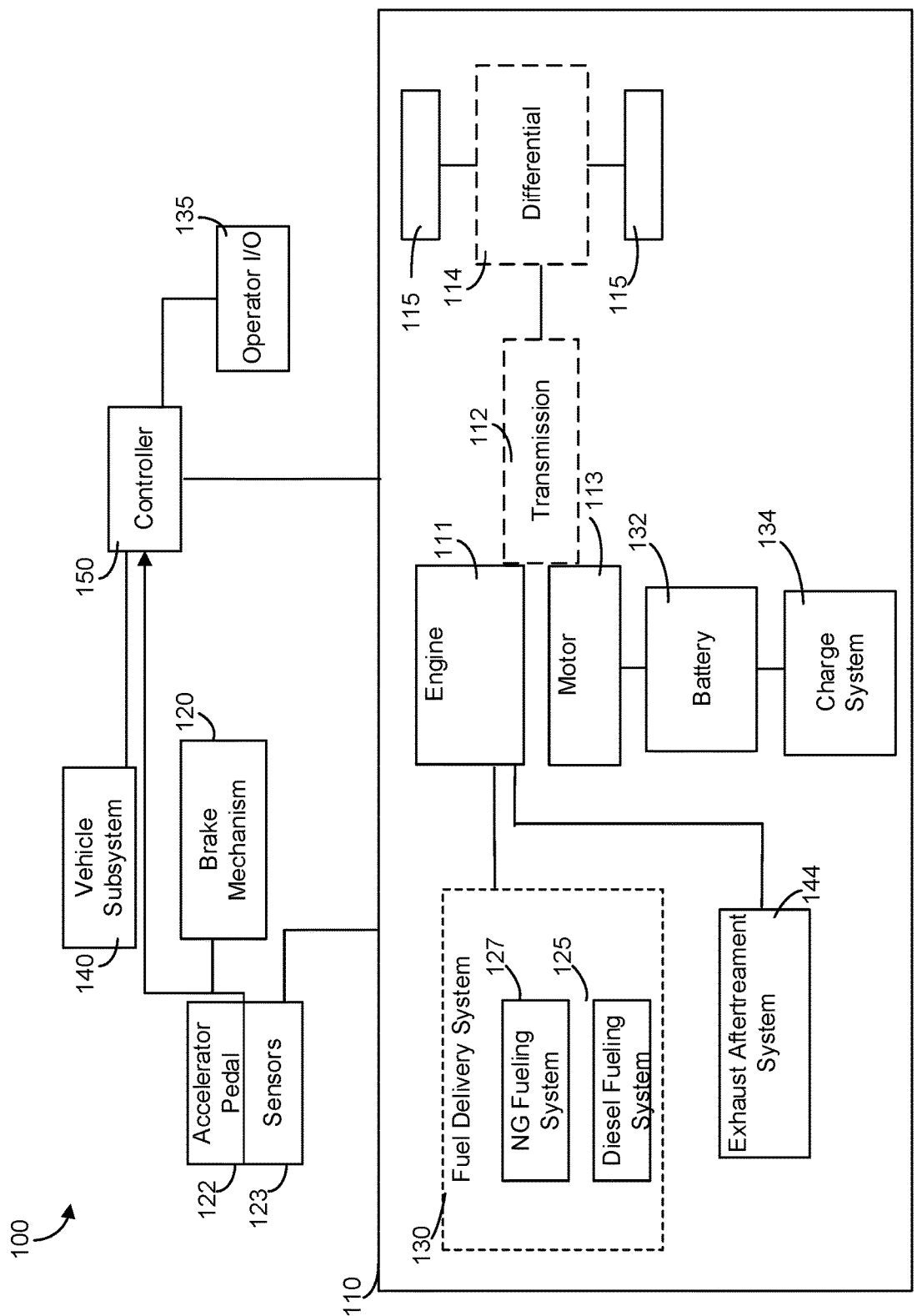
FIG. 1 is a schematic block diagram of a vehicle management system according to an example embodiment.

FIG. 1 depicts a schematic block diagram of a vehicle 100 according to an example embodiment. The vehicle 100 may be a hybrid electric vehicle (HEV), plug-in hybrid electric vehicle (PHEV), range-extended electric vehicle (REEV), extended-range electric vehicle (E-REV), range-extended battery-electric vehicle (BEVx), or another vehicle powered by or otherwise operable with a vehicle system such as, but not limited to, a battery, generator system (e.g., a power generator, generator plant, electric power strip, on-board rechargeable electricity storage system, etc.), an engine system, a motor system (e.g., an electric motor, traction motor, motor-generator unit, etc.), exhaust aftertreatment system, etc. The vehicle 100 may be operable in series (e.g., utilizing a single path that powers the wheels of the vehicle and a plurality of energy sources) or in parallel (e.g., utilizing an engine path and an electrical path to power the wheels of the vehicle). The vehicle 100 may be an on-road or off-road vehicle including, but not limited to, cars, trucks, trains, ships, boats, vans, airplanes, spacecraft, or any other type of vehicle.

As shown, the vehicle 100 includes a controller 150 communicably and operatively coupled to a brake mechanism 120 (e.g., a brake, braking system, or any other device structured to prevent or reduce motion by slowing or stopping components (e.g., a wheel, axle, pedal, etc. of a vehicle), a powertrain system 110, an operator input/output (I/O) device 135, and one or more additional vehicle subsystems 140. It should be understood that the vehicle 100 may include additional, less, and/or different components/systems than depicted in FIG. 1, such that the principles, methods, systems, apparatuses, processes, and the like of the present disclosure are intended to be applicable with any other vehicle configuration. It should also be understood that the principles of the present disclosure should not be interpreted to be limited to on-highway vehicles; rather, the present disclosure contemplates that the principles may also be applied to a variety of other applications including, but not limited to, off-highway construction equipment, mining equipment, marine equipment, locomotive equipment, etc.

As shown, the vehicle 100 includes the powertrain system 110 which facilitates power transfer from the motor 113 and/or the battery 132 to power the vehicle 100. In an example embodiment, the vehicle (e.g., a series hybrid electric vehicle) may be operable with a powertrain system 110 which includes a motor 113 operably coupled to a battery 132 and charge system 134, where the motor 113 transfers power to the final drive (shown as wheels 115) to propel the vehicle 100. As depicted, the powertrain system 110 includes various vehicle systems and/or components that may be included in a hybrid electric vehicle, such as for example, an engine 111 operably coupled to a transmission 112, a motor 113, and a differential 114, where the differential 114 transfers power output from the engine 111 to the final drive (shown as wheels 115) to propel the vehicle 100. In other embodiments, a direct drive arrangement may be utilized in which the motor 113 propels the vehicle 100 directly rather than via a transmission. In still other embodiments, power from the engine 111 is used to drive a generator, and power from the generator is used to power the motor 113. As a brief overview, the controller 150 of the vehicle 100 (e.g., a hybrid electric vehicle) provides electricity to the motor 113 (e.g., an electric motor) in response to input received by the controller 150 from the accelerator pedal 122, charge system 134 (e.g., a battery charging system, rechargeable battery, etc.), etc. In some embodiments, the electricity provided to power the motor 113 may be provided by an onboard internal combustion engine generator, a hydrogen fuel cell, etc.

In some embodiments, the vehicle 100 may also include a vehicle system comprising an engine system (e.g., the engine 111) which may be structured as an internal combustion engine that receives a chemical energy input (e.g., a fuel such as natural gas, gasoline, ethanol, or diesel) from the NG Fueling system 127, the diesel fueling system 125, or any other system of the fuel delivery system 130, and combusts the fuel to generate mechanical energy, in the form of a rotating crankshaft. The transmission 112 receives the rotating crankshaft and manipulates the speed of the crankshaft (e.g., the engine speed, which is usually expressed in revolutions-per-minute (RPM)) to effect a desired drive shaft speed. A rotating drive shaft may be received by a differential 114, which provides the rotation energy from the drive shaft to the final drive 115. The final drive 115 then propels or moves the vehicle 100. Further, the drive shaft may be structured as a one-piece, two-piece, and/or a slip-in-tube driveshaft based on the application.

In some embodiments, the vehicle 100 also includes a transmission 112. The transmission 112 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (e.g., gears, for a geared transmission) that affect different output speeds based on the engine speed. Like the engine 111, the transmission 112, motor 113, differential 114, and final drive 115 may be structured in any configuration dependent on the application (e.g., the final drive 115 may be structured as wheels in an automotive application and a propeller in an airplane application). In other embodiments, as previously mentioned, a direct drive arrangement may be utilized.

The vehicle 100 may include, in some embodiments, an exhaust aftertreatment system 144 structured to reduce diesel exhaust emissions, such as a selective catalytic reduction (SCR) catalyst, a diesel oxidation catalyst (DOC), a diesel particulate filter (DPF), a diesel exhaust fluid (DEF) doser with a supply of diesel exhaust fluid, and a plurality of sensors for monitoring the exhaust aftertreatment system 144 (e.g., a NOx sensor).

Exhaust gas may flow from the engine 111 into inlet piping of the exhaust aftertreatment system 144. From the inlet piping, the exhaust gas flows into the DOC and exits the DOC into a first section of exhaust piping. The exhaust gas then flows into the DPF and exits the DPF into the SCR catalyst. As the exhaust gas flows it is periodically dosed with DEF by the DEF doser. After the exhaust gas flows into the AMOX catalyst, the exhaust gas is expelled from the exhaust aftertreatment system 144.

Generally, the DOC is structured to oxidize at least some particulate matter, e.g., the soluble organic fraction of soot, in the exhaust and reduce unburned hydrocarbons and CO in the exhaust to less environmentally harmful compounds. For example, the DOC may sufficiently reduce the hydrocarbon and CO concentrations in the exhaust to meet one or more requisite emissions standards for those components of the exhaust gas. An indirect consequence of the oxidation capabilities of the DOC is the ability of the DOC to oxidize NO into $NO_2$. In this manner, the level of $NO_2$ exiting the DOC is equal to the $NO_2$ in the exhaust gas generated by the engine 111 plus the $NO_2$ converted from NO by the DOC. Accordingly, one metric for indicating the condition of the DOC is the $NO_2$/NOx ratio of the exhaust gas exiting the DOC.

In addition to treating the hydrocarbon and CO concentrations in the exhaust gas, the DOC can also be used in the controlled regeneration of the DPF, SCR catalyst, and AMOX catalyst. This may be accomplished through the injection, or dosing, of unburned HC into the exhaust gas upstream of the DOC. Upon contact with the DOC, the unburned HC undergoes an exothermic oxidation reaction which leads to an increase in the temperature of the exhaust gas exiting the DOC and subsequently entering the DPF, SCR catalyst, and/or the AMOX catalyst. The amount of unburned HC added to the exhaust gas is selected to achieve the desired temperature increase or target controlled regeneration temperature.

The DPF may be any of various flow-through designs known in the art, and structured to reduce particulate matter concentrations, e.g., soot and ash, in the exhaust gas to meet requisite emission standards. The DPF captures particulate matter and other constituents, and thus needs to be periodically regenerated to burn off the captures constituents. Additionally, the DPF may be structured to oxidize NO to form $NO_2$ independent of the DOC.

The SCR system may include a reductant delivery system with a reductant (e.g., DEF) source pump and delivery mechanism or doser. The reductant source may be a container or tank capable of retaining a reductant, such as, for example, ammonia ($NH_3$), DEF (e.g., urea), or diesel oil. In some embodiments, the reductant can either be ammonia or DEF, which decomposes to produce ammonia. The ammonia reacts with NOx in the presence of the SCR catalyst to reduce the NOx to less harmful emissions, such as $N_2$ and $H_2O$. The NOx in the exhaust gas stream includes $NO_2$ and NO. Generally, both $NO_2$ and NO are reduced to $N_2$ and $H_2O$ through various chemical reactions driven by the catalytic elements of the SCR catalyst in the presence of $NH_3$. However, as discussed above, the chemical reduction of $NO_2$ to $N_2$ and $H_2O$ typically is the most efficient chemical reaction. Therefore, in general, the more $NO_2$ in the exhaust gas stream compared to NO, the more efficient the $NO_x$ reduction performed by the SCR catalyst. Accordingly, the ability of the DOC to convert NO to $NO_2$ directly affects the NOx reduction efficiency of the SCR system. Put another way, the NOx reduction efficiency of the SCR system corresponds at least indirectly to the condition or performance of the DOC. However, primarily, the NOx reduction efficiency of the SCR system corresponds with the condition or performance of SCR catalyst.

The AMOX catalyst is structured to react with ammonia to produce mainly nitrogen. The AMOX catalyst is utilized to remove ammonia that has slipped through or exited the SCR catalyst without reacting with $NO_x$ in the exhaust. In certain instances, the exhaust aftertreatment system 144 may be operable with or without an AMOX catalyst. In some embodiments, the AMOX catalyst may be integrated with the SCR catalyst, e.g., the AMOX catalyst and the SCR catalyst may be located within the same housing. The condition of the AMOX catalyst may be represented by the performance of the AMOX catalyst (i.e., the ability of the AMOX catalyst to convert ammonia into mainly nitrogen).

Various sensors 123 (e.g., NOx sensors, temperature sensors, etc.) may be strategically disposed throughout the exhaust aftertreatment system 144 and may be in communication with the controller 150 to monitor operating conditions of a vehicle system (e.g., the engine 111). Although various sensors 123 may be included in the exhaust aftertreatment system 144, the one or more sensors 123 (e.g., an engine sensor, motor sensor, speed sensor, torque sensor, ambient pressure sensor, temperature sensor, etc.) may be disposed proximate to and/or may be communicatively coupled to other vehicle systems, components, etc. of the vehicle 100.

The accelerator pedal 122 may be structured as any type of torque and/or speed request device included with a system (e.g., a floor-based pedal, an acceleration lever, etc.). Further, the sensors 123 may include any type of sensors included with the brake mechanism 120, accelerator pedal 122, or any other component and/or system included in the powertrain system 110 of a vehicle. For example, the sensors 123 may include a fuel temperature sensor, a charge air temperature sensor, a coolant temperature and pressure sensor, an ambient air temperature and pressure sensor, a fuel pressure sensor, an injection pump speed sensor, and the like.

As depicted, the vehicle 100 includes the operator I/O device 135. The operator I/O device 135 enables an operator of the vehicle to communicate with the vehicle 100 and the controller 150. Analogously, the I/O device 135 enables the vehicle or controller 150 to communicate with the operator. For example, the operator I/O device 135 may include, but is not limited, an interactive display (e.g., a touchscreen, etc.) having one or more buttons/input devices, haptic feedback devices, an accelerator pedal, a brake pedal, a shifter for the transmission, a cruise control input setting, a navigation input setting, etc. Via the I/O device 135, the controller 150 can also provide commands/instructions/information to the operator (or a passenger).

The controller 150 is communicably and operatively coupled to one or more vehicle systems such as the engine system 111, motor system 113, fuel delivery system 130, exhaust aftertreatment system 144, etc. Communication between and among the components of a vehicle system may be via any number of wired or wireless connections (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data. Because the controller 150 is communicably coupled to the systems and components in the vehicle 100 of FIG. 1, the controller 150 is structured to receive data (e.g., instructions, commands, signals, values, etc.) from one or more of the components shown in FIG. 1.

Figure 2:
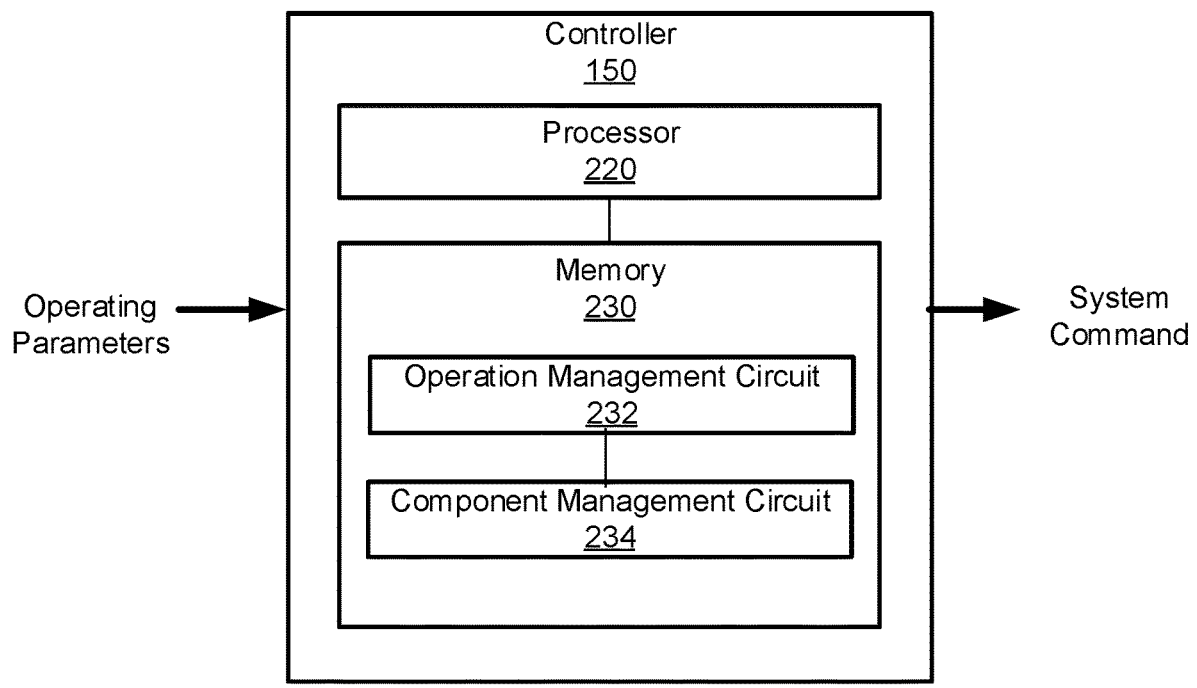
FIG. 2 is a schematic block diagram of a control system included in the vehicle management system, according to an example embodiment.

The controller 150 may be communicatively coupled to, or included within, the powertrain system 110. As shown in FIG. 2, the controller 150 may include a processor 250 such as, but not limited to, a microprocessor, programmable logic controller (PLC) chip, an ASIC chip, or any other suitable processor. The processor 250 which is in communication with the memory 230 is structured to execute instructions, algorithms, commands or otherwise programs stored in the memory. The memory 230 includes any of the memory and/or storage components discussed herein. For example, the memory 230 may include RAM and/or cache of the processor. The memory 230 may also include one or more storage devices (e.g., hard drives, flash drives, computer readable media, etc.) either local or remote to the controller 150. The memory is structured to store look up tables, algorithms, instructions, and the like. Further, as the components of FIG. 1 are shown to be embodied in a vehicle 100, the controller 150 may be structured as, include, or be communicably and operatively coupled to at least one of a power electronics system, motor controller, powertrain system controller, engine control circuit, battery management system, etc. The function and structure of the controller is described herein with reference to FIG. 2.

It should also be understood that other or additional parameters may be utilized to reduce operating expenses of the vehicle 100. For example, the parameters may include the expense data, time of day, time of operation, location data, route data, vehicle weight, ambient conditions, aftertreatment device temperature, or any other suitable parameter internal and/or external to the vehicle 100.

FIG. 2 is a schematic block diagram of a controller 150 included in the vehicle management system 100 according to an embodiment. The controller 150 may be communicatively coupled (e.g., via an over air transfer, the Internet, any type of network as described herein, etc., or a combination thereof) to a location positioning system (e.g., a GPS). In further embodiments, the controller 150 may be communicatively coupled to one or more telematics units such that one or more controllers 150 and/or telematics units are structured to carry out the features as described herein. In the present embodiment, the controller 150 includes a processor 220, memory 230, or other computer readable medium. It should be understood that the controller 150 of FIG. 2 depicts only one embodiment of the controller 150, and any other system capable of performing the operations described herein can be used.

The processor 220 can include a microprocessor, programmable logic controller (PLC) chip, an ASIC chip, or any other suitable processor. The processor 220 is in communication with the memory 230 and structured to execute instructions, algorithms, commands, or otherwise programs stored in the memory 230.

The memory 230 includes any of the memory and/or storage components discussed herein. For example, the memory 230 may include RAM and/or cache of the processor 220. The memory 230 may also include one or more storage devices (e.g., flash drives, hard drives, computer readable media, etc.) either local or remote to the controller 150. The memory 230 is structured to store look up tables, algorithms, or instructions.

The controller 150 includes an operation management circuit 232. The operation management circuit 232 is structured to receive one or more operating parameters comprising expense data. The operating parameters may be received from various components, circuits, controllers, systems, location positioning systems, etc. that may be internal and/or external to the vehicle 100. The operating parameters may include expense data, time of day, time of operation, location data, route data, vehicle weight, ambient conditions, or any other suitable parameter. As used herein, the term "expense data" refers to data associated with the financial costs of fuel, reductant, electricity, etc. In some examples, the financial cost of fuel may be measured in costs per gallon. In some examples, the financial cost of energy may be measured in costs per kilowatt hour (kwh). The financial cost of reductant may be measured in price per ton, price per pound, etc. Alternatively or additionally, the operation management circuit 232 may be further structured to determine, or otherwise receive, the one or more parameters via one or more sensors 123 associated with the one or more vehicle systems. The expense data may include actual financial costs, predicted financial costs, previous financial costs, etc. of fuel, reductant, energy, etc. For example, the expense data may include the current financial cost of fuel, reductant, electricity, etc. In some examples, the expense data may be programmed during a service event, updated according to a predetermined schedule, etc.

In other examples, the expense data may be derived from predicted expenses (e.g., predicted financial costs, values, etc.) of the fuel, energy, reductant, etc. based on a programmatic algorithm. For example, a programmatic algorithm may predict that the cost of electricity may increase N days during a heat wave such that the overall all operating costs of electricity may increase during those days. To that end, the controller 150 may programmatically utilize machine learning, via machine learning algorithms, programmatic instructions, and/or circuitry, to develop or otherwise generate an expense pattern based on the expense data (e.g., the financial cost of fuel, reductant, energy, etc.). The expense pattern may be learned according to a particular pattern recognition algorithm that analyzes one or more parameters (e.g., expense data, predicted values, etc.) based on statistical inferences. In this regard, the machine learning may be based on determining a hidden structure from unlabeled data. Alternatively or additionally, the machine learning may be based on inferring a function from a set of training patterns (e.g., expense patterns) with each training pattern placed into a classifier. The training patterns may be utilized to map new data and/or determine new inferences such that the algorithm may determine the classification of new data based, in part, on the learned training patterns. For example, the expense patterns generated based on the repeatability of the financial costs of fuel, reductant, energy, provider, and/or path (e.g., route) may be utilized to map new data and/or generate new predictions of operating expenses associated with the vehicle 100.

The operation management circuit 232 is structured to receive the expense data based on the location of the vehicle 100. In this regard, the controller 150 may be communicatively coupled to a location positioning system (e.g., a global positioning system (GPS)) structured to provide the expense data to the controller 150 based on the location of the vehicle 100. In some examples, the operation management circuit 232 may be structured to receive the expense data based on a recharging location (e.g., an off-board electric power source, electrical grid, etc.), a refueling location (e.g., a filling station, gas station, etc.) The recharging location, the refueling location, and/or any other location at which the vehicle 100 may receive fuel, reductant, energy, etc. may be located proximate to the vehicle 100. Such locations may be derived according to the path (e.g., according to the route) of the vehicle 100. For example using route look ahead, the location positioning system may determine the location of the vehicle 100 and, thereby, send expense data (e.g., the cost of fuel, energy, etc.) associated with the refueling location and/or the recharging location near, proximate to, or otherwise in the path of the vehicle 100 to the controller 150.

The controller 150 may receive (e.g., via the operation management circuit 232) the expense data based on the location of the vehicle 100 in real-time or near real-time. For example, the operation management circuit 232 of the controller 150 may receive the current financial cost of fuel provided by a provider at a location (e.g., a refueling location and/or the recharging location) within the path of the vehicle 100.

Alternatively or additionally, the vehicle 100 may include a telematics unit. The telematics unit may be structured as any type of telematics control unit. Accordingly, the telematics unit may include, but is not limited to, the location positioning system to track the location of the vehicle (e.g., latitude and longitude data, elevation data, etc.) or to identify providers of fuel, reductant, and/or energy, one or more memory devices for storing the tracked data, one or more electronic processing units for processing the tracked data, and a communications interface for facilitating the exchange of data between the telematics unit and one or more remote devices (e.g., a provider/manufacturer of the telematics device, etc.).

In some examples, the controller 150 may be communicatively coupled, via the operation management circuit 232, to a third party system structured to provide the expense data. For example, the operation management circuit 232 may transmit data to and/or receive data from a third party application program interface (API) associated with one or more providers of fuel, reductant, electricity, etc. In examples wherein the expense data is based on the recharging location, the refueling location, etc. derived according to the path of the vehicle 100, the operation management circuit 232 may receive expense data (e.g., financial cost data associated with fuel, reductant, energy, etc.) from one or more providers located near the determined location of the vehicle 100 via the API. In some examples, the operation management circuit 232 may suggest alternative providers (e.g., an alternate filing station, recharging station, location, etc.) to obtain, for example, fuel from based on the expense data received and/or retrieved via the API.

The operation management circuit 232 may be structured to adjust the operating expenses of a vehicle system based on the one or more parameters. For example, if one or more parameters include expense data indicative of a fuel, reductant, and/or energy cost above a predetermined threshold, the operation management circuit 232 may adjust (e.g., increase) the current operating expense comprising an expense for fuel, reductant, and/or energy. If one or more parameters include expense data indicative of a fuel, reductant, and/or energy cost below a predetermined threshold, the operation management circuit 232 may adjust (e.g., decrease) the current operating expense. The current operating expense may be provided to or otherwise retrieved by the component management circuit 234.

The controller 150 includes the component management circuit 234. The component management circuit 234 may be structured to adjust a performance state (e.g., the performance level, output, etc. of a vehicle system) of the vehicle system based on the one or more parameters. The performance state may include a mode of operation. For example, the performance state may include an on state, off state, current output state, etc. of the vehicle system. The performance state may be adjusted according to one or more operating parameters (expense data, time of day, time of operation, location data, route data, vehicle weight, ambient conditions, etc.). For example, the performance state may be moved between the on state and the off state, an increased output state and/or a decreased output state, etc. based on the operating parameters. The controller 150 may monitor the vehicle system (e.g., the engine, aftertreatment system, electric motor, battery, etc.) of the vehicle 100 via the component management circuit 234 such that the controller 150 may adjust the performance state of the vehicle system based on the current operating expense and the performance of the vehicle system.

The controller 150 may adjust operation of the vehicle system and/or the operating expense according to an expense reduction algorithm. In this regard, the expense reduction algorithm may include programmatic instructions that compare the current operating expense to the predetermined threshold (e.g., a predetermined operating amount associated with the currency of a region, country, or area such as, but not limited to, a US dollar amount). In some examples, the predetermined threshold may be static (e.g., pre-programmed/hardcoded), programmed during a service event, updated according to a predetermined schedule, etc. In other examples, the predetermined threshold may be dynamic such that the threshold may vary based on inputs such as, but not limited to, a fuel price index (e.g., diesel price index), power price index, commodity price index, the supply and demand of fuel, reductant, and/or energy, actual financial costs, predicted financial costs, previous financial costs of fuel, reductant, energy, and any other factor that may determine the price of fuel, reductant, and/or energy. Such inputs may be received by the controller 150 via a wireless network, a third party application program interface (API) associated with one or more providers of fuel data, reductant data, and/or electricity data, etc. The predetermined threshold may be in the range of a predetermined minimum to a predetermined maximum. If the current operating expense is not at and/or not above the predetermined threshold, a command structured to adjust operation of the vehicle system may not be generated. If the current operating expense is at and/or above the predetermined threshold or outside of the range corresponding to the predetermined threshold, a command structured to adjust operation of the vehicle system may be generated as described herein.

In some examples, the component management circuit 234 may move the performance state of the vehicle system (e.g., the engine 111) between states. For example, the engine 111 may currently be in an "active" state (e.g., a powered on state). If the expense data indicates that the fuel cost are above the predetermined threshold, the operation management circuit 232 may adjust (e.g., increase) the operating expense to reflect the increase in fuel costs. The component management circuit 234 may receive or otherwise retrieve the increased operating expense from the operation management circuit 232 and, in turn, move the performance state of the engine 111 from the "active" state to the "inactive" state (e.g., a powered off state, reduced power state, etc.) to reduce fuel consumption. Alternatively or additionally, the component management circuit 234 may move the performance state of the motor 113 and/or the battery 132 from the inactive state to the active state while the engine 111 is in the inactive state. For example, if the expense data indicates that the energy cost is below the predetermined threshold and/or the fuel costs, the operation management circuit 232 may move the performance state of the motor 113 and/or the battery 132 from the inactive state to the active state while the engine 111 is in the inactive state to reduce operating expenses.

In some examples, if the expense data indicates that the energy cost are above the predetermined threshold, the operation management circuit 232 may adjust (e.g., increase) the operating expense to reflect the increase in energy costs. The component management circuit 234 may receive or otherwise retrieve the increased operating expense from the operation management circuit 232 and, in turn, determine that the performance state of the battery 132 and/or the motor 113 should be moved from the "active" state to the "inactive" state to reduce energy consumption. In some examples, it may be advantageous to adjust the operation of the motor 113 and/or the battery 132 when the expense data indicates that the fuel cost is lower than the energy cost. For example, if the expense data indicates that the fuel cost is below the predetermined threshold and/or the energy cost, the operation management circuit 232 may move the performance state of the motor 113 and/or the battery 132 from the active state to the inactive state while the engine 111 performance state is moved from the inactive state to the active state to reduce operating expenses.

In some embodiments, the component management circuit 234 may generate a command structured to adjust operation of the vehicle system responsive to the adjustment of the operating expense. The command (e.g., signal, instruction, etc.) may be generated responsive to the adjustment of the performance state of the vehicle system. The command may cause an adjustment of the respective performance state of one or more vehicle systems such as the engine system, generator system, electric motor system, aftertreatment system, etc. to, thereby, reduce or otherwise adjust operating expenses. For example, the component management circuit 234 is further structured to generate a command to adjust operation of the vehicle system (e.g. the engine system) in response to movement of the vehicle system between the performance states (e.g., between an active state and an inactive state) such that the operating expense is reduced from the reduced use of the fuel, energy, reductant, etc. Advantageously, the adjustment of the operation of the vehicle system optimizes the operating expenses of the fuel, reductant, and electricity.

Alternatively or additionally, the component management circuit 234 may be structured to output a notification of the reduction of the operating expense by changing the performance state of the vehicle system. In some embodiments, the component management circuit 234 may be structured to output a notification of the adjusted vehicle system based on the command generated. The component management circuit 234 may output the notification via an onboard diagnostic system, a display associated with a vehicle, or a combination thereof. Alternatively or additionally, the component management circuit 234 may output the notification to a remote user device via a network configured for wireless communication such as WiFi. In some embodiments, the component management circuit 234 may output the notification to the telematics unit. In turn, the telematics unit may provide the notification to a user or operator of the vehicle 100 via a vehicle management interface (e.g., a user interface or mobile application configured to manage one or more vehicles, such as a fleet of vehicles).

Figure 3:
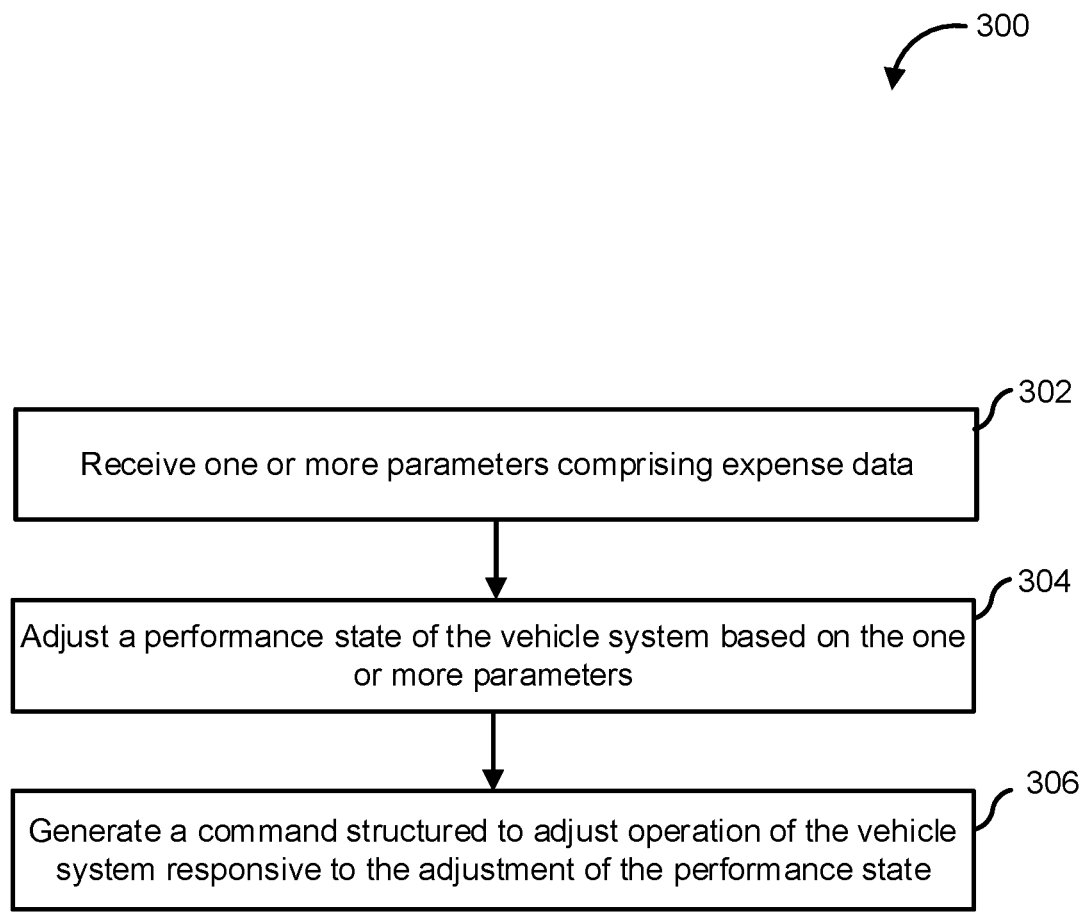
FIG. 3 is a schematic flow diagram of an example method of reducing operating expenses of a vehicle included in an example vehicle management system.

FIG. 3 is a flow diagram of an example process 300 for a vehicle management system to manage a vehicle system (e.g., the engine system, generator system, electric motor system, aftertreatment system) via the circuitry described herein with reference to FIGS. 1-2. At 302, the process 300 includes receiving one or more parameters comprising expense data (e.g., actual financial costs, predicted financial costs, previous financial costs, etc. of fuel, reductant, energy, etc.). The operating parameters (e.g., expense data, time of day, time of operation, location data, route data, vehicle weight, ambient conditions, etc.) may be received based on the location of the vehicle, provided by one or more sensors, and/or derived from predicted expenses associated with the one or more vehicle systems.

A performance state (e.g., the performance level, output, etc. of a vehicle system) of the vehicle system may be adjusted based on the one or more parameters at 304. The controller may move the performance state of the vehicle system between states. For example, the vehicle system may be in an "active" state. If the expense data indicates that the cost (e.g., the reductant cost) is above a predetermined threshold, the controller may adjust the operating expense to reflect the increase in costs. The controller may, in turn, move the performance state of the vehicle system between the "active" state and the "inactive" state to reduce the operating expense.

At 306, a command structured to adjust operation of the vehicle system may be generated responsive to the adjustment of the performance state of the vehicle system by the control system. The command may cause the adjustment of the performance state of the vehicle system. Advantageously, the operating expense may be reduced response to the adjustment of the performance state of the vehicle system.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom VLSI circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

Circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit.

Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network. Where a circuit or portions of a circuit are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a computer or entirely on the computer or server. In the latter scenario, the computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope. No claim element herein is to be construed under the provisions of 35 U.S.C. § 112, sixth paragraph, unless the element is expressly recited using the phrase "means for.".

What is claimed is:

1. A system, comprising:
a vehicle system, the vehicle system being one of a plurality of vehicle systems of a fleet; and
a controller communicatively coupled to the vehicle system, the controller structured to:
receive, from a remote device associated with the fleet, one or more parameters comprising expense data including a financial cost of electricity, and at least one of a time of day, a time of operation, or an ambient condition;
determine a route of a vehicle with the vehicle system to predict a future financial cost of electricity based on an expense pattern regarding electricity for the route, wherein the expense pattern is determined based on the expense data, and the at least one of the time of day, the time of operation, or the ambient condition;
compare the expense data to a threshold via an expense reduction algorithm that utilizes real-time or near real-time expense data including the financial cost of electricity and the at least one of the time of day, the time of operation, or the ambient condition, wherein the threshold is dynamic based at least partially on the predicted future financial cost;
adjust a performance state of the vehicle system based on the comparison to the threshold; and
generate a command structured to adjust operation of the vehicle system responsive to the adjustment of the performance state, wherein the adjustment of the operation of the vehicle system includes one of turning off and reducing a power output from an engine of the vehicle system based on the comparison indicating that the financial cost of electricity is below the predetermined threshold.

2. The system of claim 1, wherein the vehicle system comprises an engine system, a generator system, an electric motor system, aftertreatment system, or a combination thereof.

3. The system of claim 1, wherein the expense data further comprises data associated with financial costs of fuel, reductant, or a combination thereof.

4. The system of claim 1, wherein the vehicle is an on-road vehicle or an off-road vehicle.

5. The system of claim 1, wherein the controller is communicatively coupled to a location positioning system, and wherein the controller is further structured to receive the expense data based on a location of a vehicle comprising the vehicle system, a recharging location, a refueling location, or a combination thereof.

6. The system of claim 5, wherein the controller is further structured to receive the expense data based on the location of the vehicle in real-time or near real-time.

7. The system of claim 5, wherein the recharging location, the refueling location, or the combination thereof is located proximate to the vehicle according to a path of the vehicle.

8. The system of claim 1, wherein the controller is communicatively coupled to a third party system structured to provide the expense data.

9. A system structured to reduce operating expenses of a vehicle based on control of operation of a vehicle system, the system comprising:
a controller structured to:
receive one or more parameters comprising expense data including a financial cost of electricity, and at least one of a time of day or an ambient condition;
determine a route of the vehicle to predict a future financial cost of electricity based on an expense pattern regarding electricity for the route, wherein the expense pattern is determined based on the expense data, and the at least one of the time of day or the ambient condition;
compare the expense data to a threshold via an expense reduction algorithm that utilizes real-time or near real-time expense data including the financial cost of electricity and the at least one of the time of day or the ambient condition, wherein the threshold is dynamic based at least partially on the predicted future financial cost;
adjust operating expenses of a vehicle system based on the comparison to the threshold; and
generate a command structured to adjust operation of the vehicle system responsive to the adjustment of the operating expenses, wherein the adjustment of the operation of the vehicle system includes one of turning off and reducing a power output from an engine of the vehicle based on the comparison indicating that the financial cost of electricity is below the predetermined threshold.

10. The system of claim 9, further comprising an engine system, a generator system, an electric motor system, aftertreatment system, or a combination thereof.

11. The system of claim 9, wherein the expense data further comprises data associated with financial costs of fuel, reductant, or a combination thereof.

12. The system of claim 9, wherein the controller is communicatively coupled to a location positioning system, and wherein the controller is further structured to receive the expense data based on a location of a vehicle comprising the vehicle system, a recharging location, a refueling location, or a combination thereof.

13. The system of claim 12, wherein the controller is further structured to receive the expense data based on the location of the vehicle in real-time or near real-time, and wherein the recharging location, the refueling location, or the combination thereof are located proximate to the vehicle according to a path of the vehicle.

14. A method for reducing operating expenses of a vehicle based on control of operation of a vehicle system, the method comprising:
   receiving one or more parameters comprising expense data including a financial cost of electricity, and at least one of a time of day, a time of operation, or an ambient condition;
   determining a route of the vehicle to predict a future financial cost of electricity based on an expense pattern regarding electricity for the route, wherein the expense pattern is determined based on the expense data, and the at least one of the time of day, the time of operation, or the ambient condition;
   comparing the expense data to a threshold via an expense reduction algorithm that utilizes real-time or near real-time expense data including the financial cost of electricity and the at least one of the time of day, the time of operation, or the ambient condition, wherein the threshold is dynamic based at least partially on the predicted future financial cost;
   adjusting operating expenses of a vehicle system based on the comparison to the threshold; and
   generating a command structured to adjust operation of the vehicle system responsive to the adjustment of the operating expenses, the adjustment of the operation of the vehicle system including one of turning off and reducing a power output from an engine of the vehicle based on the comparison indicating that the financial cost of electricity is below the predetermined threshold.

15. The method of claim 14, further comprising receiving the expense data based on a location of a vehicle comprising the vehicle system, a recharging location, a refueling location, or a combination thereof.

16. The method of claim 14, wherein the vehicle system comprises an engine system, a generator system, an electric motor system, aftertreatment system, or a combination thereof, and wherein the expense data comprises data associated with costs of fuel, reductant, or a combination thereof.

* * * * *